United States Patent
Sun et al.

(10) Patent No.: US 8,271,018 B2
(45) Date of Patent: Sep. 18, 2012

(54) METHOD, SYSTEM, AND EQUIPMENT FOR IMPLEMENTING CENTRAL CONTROL OF A 2G NETWORK ELECTRIC REGULATING ANTENNA

(75) Inventors: Weidong Sun, Shenzhen (CN); Guotian Ma, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 687 days.

(21) Appl. No.: 12/366,926

(22) Filed: Feb. 6, 2009

(65) Prior Publication Data
US 2009/0197634 A1    Aug. 6, 2009

Related U.S. Application Data

(63) Continuation of application No. PCT/CN2007/070431, filed on Aug. 8, 2007.

(51) Int. Cl.
*H04B 7/00* (2006.01)
(52) U.S. Cl. ........................................... 455/524
(58) Field of Classification Search ............... 455/562.1, 455/561, 523, 522, 524
See application file for complete search history.

(56) References Cited

U.S. PATENT DOCUMENTS

| | | | |
|---|---|---|---|
| 6,731,905 B2 * | 5/2004 | Ogino et al. | 455/11.1 |
| 7,450,066 B2 * | 11/2008 | Haskell | 342/368 |
| 7,466,990 B2 * | 12/2008 | Mellor et al. | 455/523 |
| 7,877,110 B2 * | 1/2011 | Feher | 455/550.1 |
| 2004/0152492 A1 | 8/2004 | Gray | |

FOREIGN PATENT DOCUMENTS

| | | |
|---|---|---|
| CN | 1578523 A | 2/2005 |
| GB | 2 414 137 A | 11/2005 |
| JP | 2004-229220 | 8/2004 |
| WO | 03/079484 A2 | 9/2003 |
| WO | 2005/048401 A1 | 5/2005 |
| WO | 2006/057613 A1 | 6/2006 |

OTHER PUBLICATIONS

"Control Interface for Antenna Line Devices" Antenna Interface Standards Group—Standard No. AISG1: Issue 1.1. Jul. 30, 2004.
"Control Interface for Antenna Line Devices" Antenna Interface Standards Group—Standard No. AISG v 2.0. Jun. 13, 2006.
Written Opinion of the International Searching Authority issued in corresponding PCT Application No. PCT/CN2007/070431; mailed Nov. 22, 2007.
Supplementary European Search Report issued in corresponding European Patent Application No. 07 78 5421; issued Aug. 18, 2010.
International Search Report issued in corresponding PCT Application No. PCT/CN2006/060431; mailed Nov. 22, 2007.
European Communication issued in corresponding European Patent Application No. 07785421.4, mailed Aug. 31, 2010.

* cited by examiner

*Primary Examiner* — Brian Young
(74) *Attorney, Agent, or Firm* — Brinks Hofer Gilson & Lione

(57) ABSTRACT

A method, a system, and an equipment for implementing the central control of a 2G network electric regulating antenna are disclosed. The embodiment of the method includes: receiving an ID of the electric regulating antenna to be controlled and a control command; determining the 2G network electric regulating antenna according to the ID; and sending the control command by a 3G base station equipment to the 2G network electric regulating antenna to control the 2G network electric regulating antenna. The embodiment of the system includes a control platform and a 3G base station equipment. The embodiment of the equipment includes a memory unit and a control unit.

20 Claims, 5 Drawing Sheets

METHOD, SYSTEM, AND EQUIPMENT FOR IMPLEMENTING CENTRAL CONTROL OF A 2G NETWORK ELECTRIC REGULATING ANTENNA

CROSS REFERENCES TO RELATED APPLICATIONS

The application is a continuation application of International Application No. PCT/CN2007/070431, filed Aug. 8, 2007, which claims priority to Chinese Patent Application No. 200610109549.X, filed Aug. 8, 2006.

BACKGROUND OF THE DISCLOSURE

1. Field of the Disclosure

The present disclosure relates to the communication field, and more particularly to a method, a system, and an equipment for implementing the central control of a 2G network electric regulating antenna.

2. Background of the Disclosure

The mobile communication antenna technology develops quickly. At first, mainly ordinary directional and omnidirectional mobile antennas are adopted, and electric regulating antennas have already been used in some mobile networks. The electric regulating antenna is a mobile antenna with the down-tilt angle being electrically regulated. The principle of electrical tilt is tilting down the vertical directivity diagram of the antenna by changing the phase of the collinear array antenna oscillator, the amplitude of vertical and horizontal components, and the resultant field intensity of the components, therefore the vertical directivity diagram of the antenna is tilted down. Because the field intensities of the antenna in all directions are increased or decreased simultaneously, the antenna directivity diagram after tilt angle changes may not vary too much. Thereby, the distance covered in the main lobe direction is shortened, and meanwhile the whole directivity diagram obtains a reduced coverage area in the sector of the service cell without generating any interference.

In practice, when the down-tilt angle of the electric regulating antenna varies between 1°-5°, its antenna directivity diagram is similar to that of a mechanical antenna. When the down-tilt angle varies between 5°-10°, its antenna directivity diagram is slightly modified than that of the mechanical antenna. When the down-tilt angle varies between 10°-15°, its antenna directivity diagram is greatly modified than that of the mechanical antenna. When the electric regulating antenna tilts down by 15°, its antenna directivity diagram is apparently different from that of the mechanical antenna. At this point, the directivity diagram of the electric regulating antenna has not been greatly altered, but the distance covered in the main lobe direction is significantly shortened. Because the whole antenna directivity diagram is in the base station sector, when the down-tilt angle is increased, the sector coverage will be reduced without generating any interference. Such a directivity diagram is desired, so the electric regulating antenna can be adapted to reduce the call loss as well as the interference. Moreover, the electric regulating antenna may significantly reduce the running maintenance cost of the antenna down-tilt angle and improve the working efficiency. Therefore, with the maturation of relative technology about the electric regulating antenna and the construction of the 3G network, operators are more willing to employ the electric regulating antennas.

Currently, ordinary antennas in a 2G network have been replaced by electric regulating antennas, or electric regulating antennas are adopted in newly-added 2G networks. Methods are provided to solve the control problem of using the electric regulating antenna, and generally the electric regulating antenna is controlled by a 2G base station equipment.

Because the 2G base station equipment is rather mature and stable while the electric regulating antenna is quite new, the control of the 2G base station equipment on the electric regulating antenna can be conducted in the following two manners.

1. The function of the electric regulating antenna is integrated into the operation maintenance center (OMC), and the 2G equipment in the current network is updated. However, in this manner, the development investment on the 2G software is increased, and the hardware needs to be modified because the existing one does not support the communication modes stated in the Antenna Interface Standards Group (AISG) protocol. The modification of the software/hardware may affect the product stability. Besides, the cost is raised because the hardware is upgraded by replacing the single board.

2. The electric regulating equipment is controlled through an independent maintenance terminal. A detailed system is shown in FIG. 1, and a user sends a control command to a regulating control unit (RCU) of the electric regulating antenna through the independent maintenance terminal, instead of controlling through the existing 2G equipment. Because the electric regulating antennas correspond to the sectors in the base station NodeB one by one, if the antenna and the NodeB are maintained separately, the user has to sustain this corresponding relationship, thus making the maintenance more complicated. Besides, if the user constructs the 3G network at the same time, because the NodeB has already agreed to uniformly maintain a 3G electric regulating equipment, the 3G equipment may directly control the electric regulating antennas. In this manner, the 2G network has to adopt an independent maintenance terminal, and the 3G network directly employs the 3G equipment to control the electric regulating antenna, thus resulting in the increased cost due to different maintenance modes. Moreover, if the independent maintenance terminal is purchased by the user, the cost is further increased.

In view of the above, the prior art is able to realize the replacement of the ordinary antennas in a 2G network with electric regulating antennas or the control of electric regulating antennas after being employed in newly-added 2G networks. However, these methods are high in upgrade risk and cost as well as maintenance complexity and cost.

SUMMARY

Accordingly, embodiments of the present disclosure is directed to a method, system, and equipment for implementing a central control of a 2G network electric regulating antenna, so as to achieve the central control of the 2G network electric regulating antenna that is simple in operation and easy to maintain.

The technical solutions provided in the embodiments of the present disclosure are described below:

An embodiment of the present disclosure provides a method for implementing the central control of a 2G network electric regulating antenna. The method includes the following steps.

An ID of the 2G electric regulating antenna to be controlled and a control command are received.

The corresponding 2G network electric regulating antenna is found according to the ID.

A 3G base station equipment sends the control command to the 2G network electric regulating antenna to control the 2G network electric regulating antenna.

An embodiment of the present disclosure provides a system for implementing the central control of a 2G network electric regulating antenna, which includes a control platform and a 3G base station equipment. The control platform is adapted to receive and send an ID of the 2G network electric regulating antenna to be controlled and a control command to a 3G base station. The 3G base station equipment is adapted to receive the ID of the electric regulating antenna and the control command from the control platform, determine the corresponding 2G network electric regulating antenna according to the ID, and send the control command to the electric regulating antenna, so as to control the 2G network electric regulating antenna.

The present disclosure provides a 3G base station, which includes a memory unit and a control unit. The memory unit is adapted to store an ID of a 2G network electric regulating antenna. The control unit is adapted to send a control command to the 2G network electric regulating antenna corresponding to the ID thereof.

Because the 2G and 3G networks are allocated with different frequency bands, no interference exists, and thus the electric regulating antennas for different networks can be installed at a closer distance. Further, the modems used in different networks have similar functions, so a single modem can be adopted for signal demodulation. In the embodiments of the present disclosure, the central control of a 2G network electric regulating antenna is performed by a 3G base station, so that it is unnecessary to upgrade the 2G base station equipment, thus reducing the upgrade risk and cost. Moreover, because the corresponding relationship between the base station sectors and the electric regulating antennas does not require particular maintenance from the user, the maintenance cost is greatly reduced. In addition, the operation is also simplified for the user.

BRIEF DESCRIPTION OF THE DRAWINGS

The present disclosure may be more fully understood with reference to the figures below, which are provided for illustration purposes only and are not intended to limit the claims.

DETAILED DESCRIPTION OF THE EMBODIMENTS

A method for implementing the central control of a 2G network electric regulating antenna is provided in the embodiments of the present disclosure. In this method, a 3G base station is adapted to perform the central control on the 2G network electric regulating antenna. Because the 2G and 3G networks are allocated with different frequency bands and no interference exists, the electric regulating antennas for different networks can be installed at a closer distance. Besides, a single modem (SBT) can be adopted to demodulate control signals. Each antenna in the link layer is identified by a high-level data link control (HDLC) address specified in the AISG, and also distinguished by a globally unique serial number. The electric regulating antennas and modems used in the 2G and 3G networks are similar; therefore the 3G base station can be adopted to control the electric regulating antenna in the 2G network through software.

Figure 1:
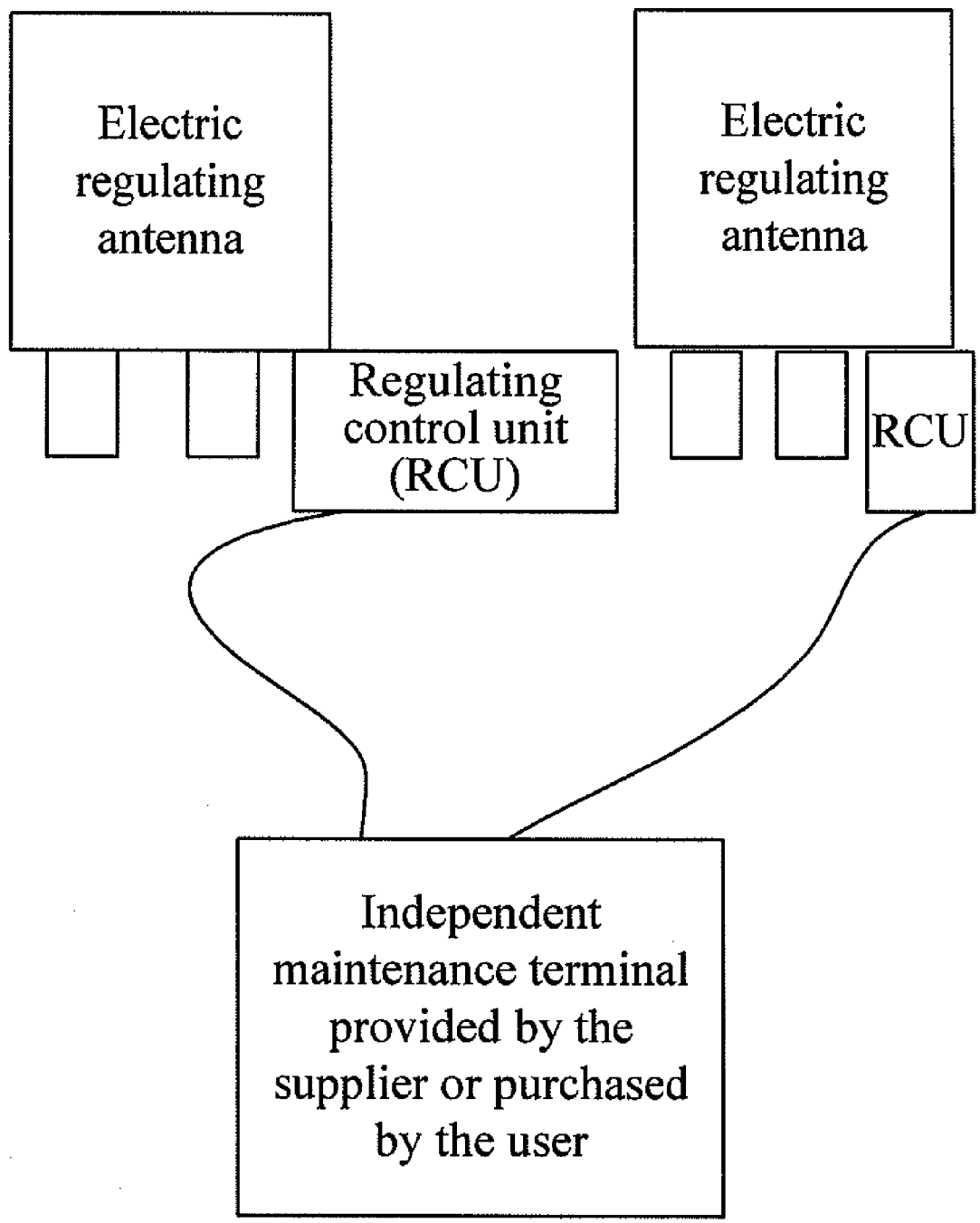
FIG. 1 is a schematic networking diagram of a second prior art.
Figure 2:
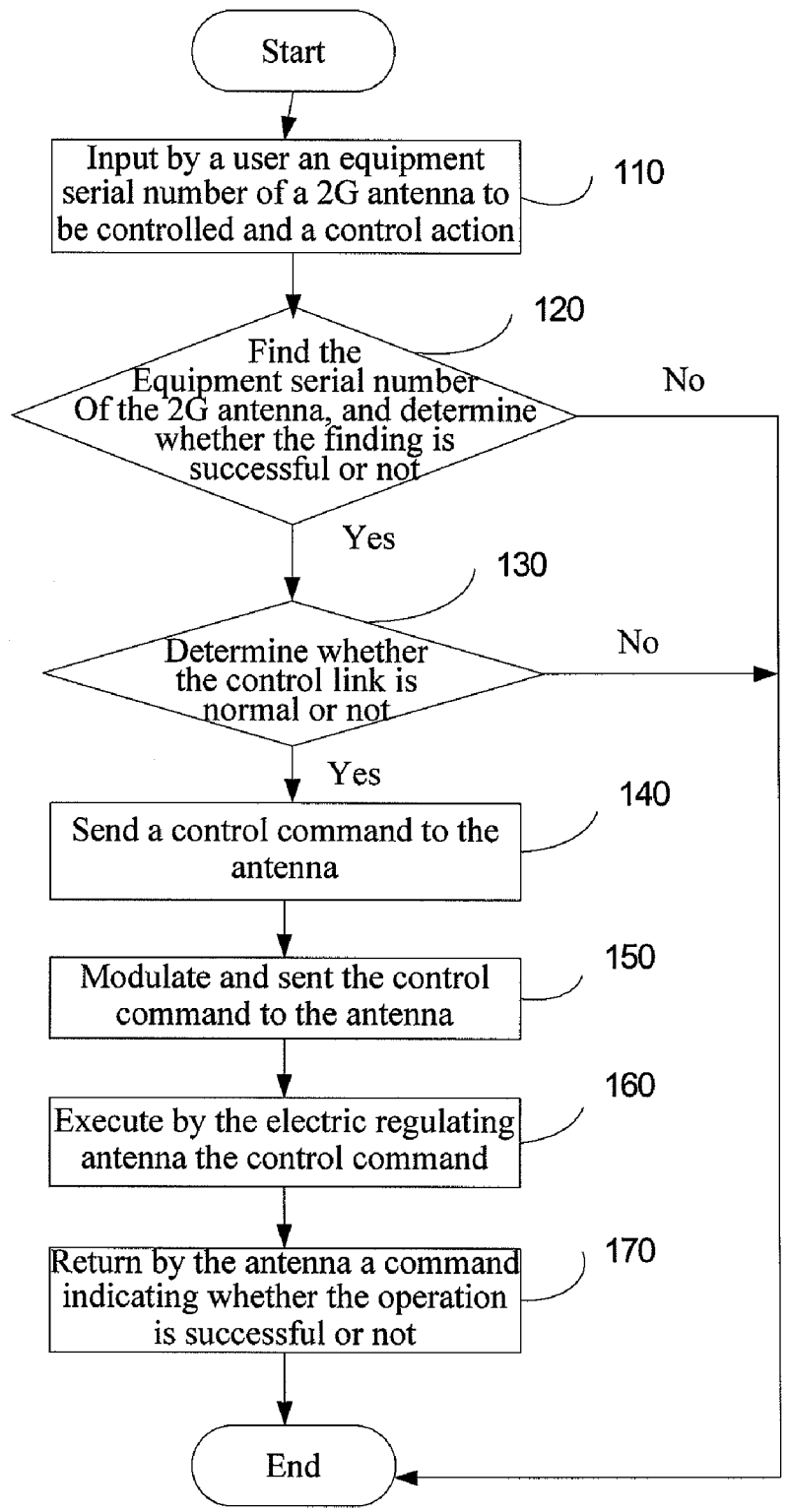
FIG. 2 is a flow chart of one embodiment.

Referring to FIG. 2, in a first embodiment, the control is realized by determining a globally unique serial number of the electric regulating antenna.

In Step 110, a user inputs an equipment serial number of a 2G antenna to be controlled and a control action to a control platform, and the control platform transmits the serial number of the 2G electric regulating antenna to be controlled and the control action to a 3G base station equipment.

In Step 120, the 3G base station equipment determines the equipment serial number of the 2G electric regulating antenna. If the result is successful, Step 130 is performed; otherwise, the process ends.

In Step 130, the 3G base station equipment determines whether a control link is normal or not, and if normal, Step 140 is performed; otherwise, the process ends.

In the step of determining whether the control link is normal or not, main process is that the 3G base station equipment sends a receive ready (RR) frame in the HDLC protocol to the electric regulating antenna, and defines that a time-out time of the RR frame is 100 ms. If the sending of the RR frame is time out, for example, more than five times, it is determined that the link is abnormal.

It should be understood that, the determination of whether the control link is normal or not may also be performed by other methods. For example, the time-out time is set as 70 ms, and the time-out for more than three times is considered as abnormal.

In Step 140, the 3G base station equipment sends an analog signal control command to the electric regulating antenna.

In Step 150, the analog signal control command is modulated into a digital signal and then sent to the electric regulating antenna.

In Step 160, the electric regulating antenna executes the control command for down-tilt angle regulation.

In Step 170, after executing the control command, the electric regulating antenna demodulates information about whether the operation is successful or not into an analog signal, and sends the signal to the control platform through the 3G base station equipment.

In this embodiment, to solve the problem that it is impossible to identify according to the station, cell, or physical location in the 3G network because there is no relative information about the 2G network in the 3G network, a serial number of the electric regulating antenna corresponding to the 2G network electric regulating antenna needs to be added in the 3G base station during the installation of the electric regulating antenna.

In order to facilitate the memory and operation of the user, the user himself/herself can create the name of the electric regulating antenna for management.

Figure 3:
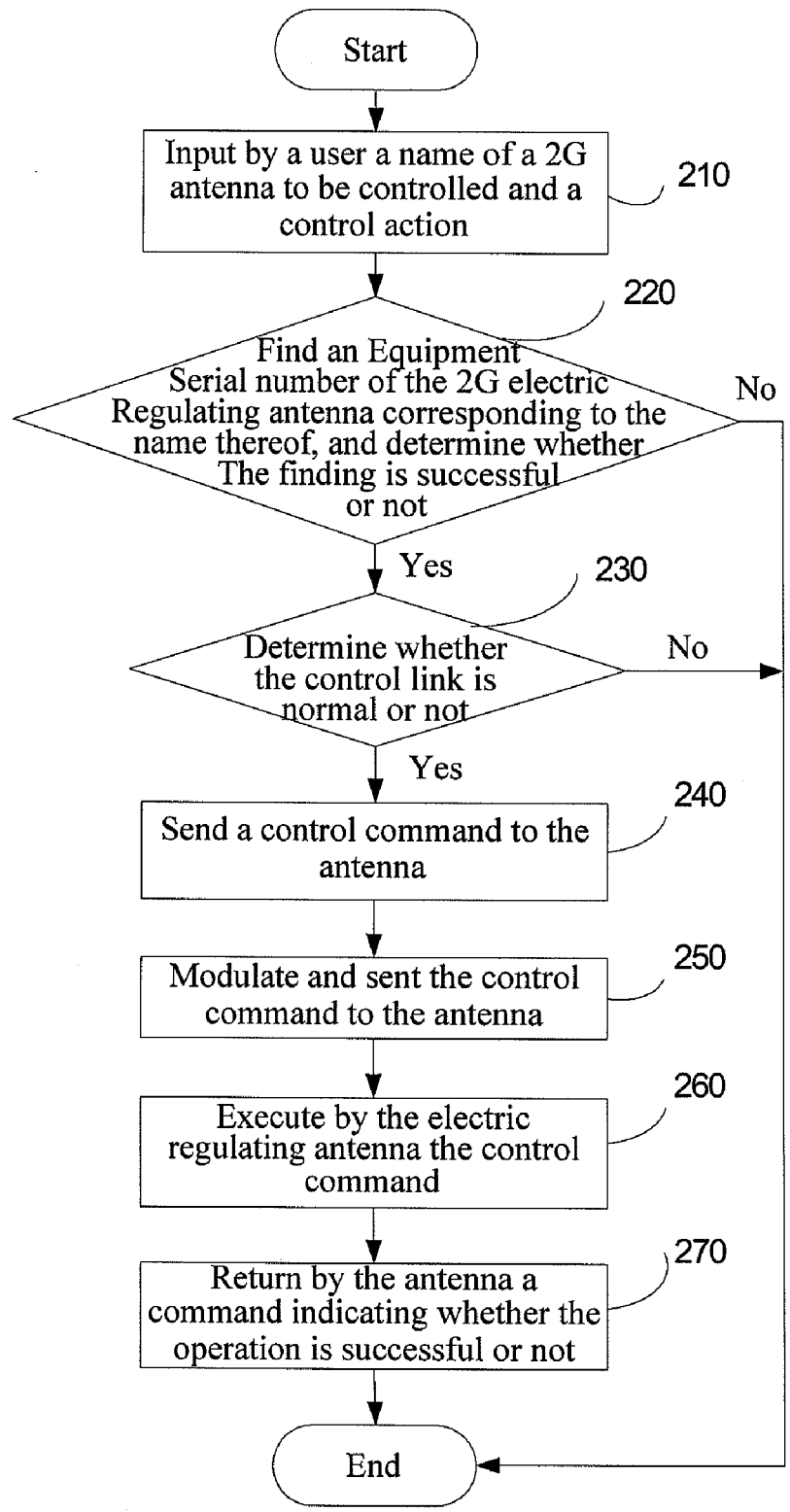
FIG. 3 is a flow chart of another embodiment.

Referring to FIG. 3, in a second embodiment, the control is realized by setting a name of the electric regulating antenna corresponding to a globally unique serial number of the electric regulating antenna.

In Step 210, a user inputs a name of a 2G antenna to be controlled and a control action to a control platform, and the control platform transmits the name of the 2G electric regulating antenna to be controlled and the control action to a 3G base station equipment.

In Step 220, the 3G base station equipment determines an equipment serial number of the 2G electric regulating antenna corresponding to the name thereof. If the result is successful, Step 230 is performed; otherwise, the process ends.

In Step 230, the 3G base station equipment determines whether a control link is normal or not, and if normal, Step 240 is performed; otherwise, the process ends.

The determination of the control link is identical to that of the first embodiment, and the details will not be repeated herein.

In Step 240, the 3G base station equipment sends an analog signal control command to the electric regulating antenna.

In Step 250, the analog signal control command is modulated into a digital signal and then sent to the electric regulating antenna.

In Step 260, the electric regulating antenna executes the control command for down-tilt angle regulation.

In Step 270, after executing the control command, the electric regulating antenna demodulates information about whether the operation is successful or not into an analog signal, and sends the signal to the control platform through the 3G base station equipment.

In Step 210 of this method, the 2G electric regulating antenna to be controlled input by the user is named in the following rule:

station_sector+antenna port+RF sub-sector serial number+equipment type_network type In the above formula:

The station means the serial number of an "added station"; the sector equals to the "sector serial number"; the antenna port is the port serial number of the antenna connected to the base station;

the RF sub-sector serial number is the serial number of each RF sub-sector when the sector is split, and its value is fixedly 0 if the sector is not split;

the equipment type is adapted to identify whether the currently connected equipment is a tower mounted amplifier (TMA) or a remote electrical tilt (RET) unit; and the network type is adapted to identify whether a 2G or a 3G network is employed.

For example, for No. 0 station; No. 0 sector; A-port connection; No. 0 RF sub-sector; RET; and 2G, the ID is 0_0A0RET_2G.

In the 3G network, the name and the specific serial number of the antenna can be bound for antenna maintenance. For example, an electric regulating antenna in a 2G network has a supplier of KA and an equipment serial number of 012345678901234. The corresponding relationship can be described as follows.

| Antenna Name | Supplier Code | Equipment Serial Number | Equipment Type |
|---|---|---|---|
| 0_0A0RET_2G | KA | 012345678901234 | RET |

The naming rule of the electric regulating antenna in this embodiment are not limited thereto, and any rule is applicable as long as the operation is simplified and the electric regulating antenna is uniquely identified.

In this embodiment, to solve the problem that it is impossible to identify according to the station, cell, or physical location in the 3G network because the 3G network does not have relative information about the 2G network, a name of the electric regulating antenna according to the preset naming rule needs to be added in the 3G base station during the installation of the electric regulating antenna, and the 3G base station scans the serial number of the electric regulating equipment to match with the 2G electric regulating antenna according to the corresponding relationship.

Figure 4:
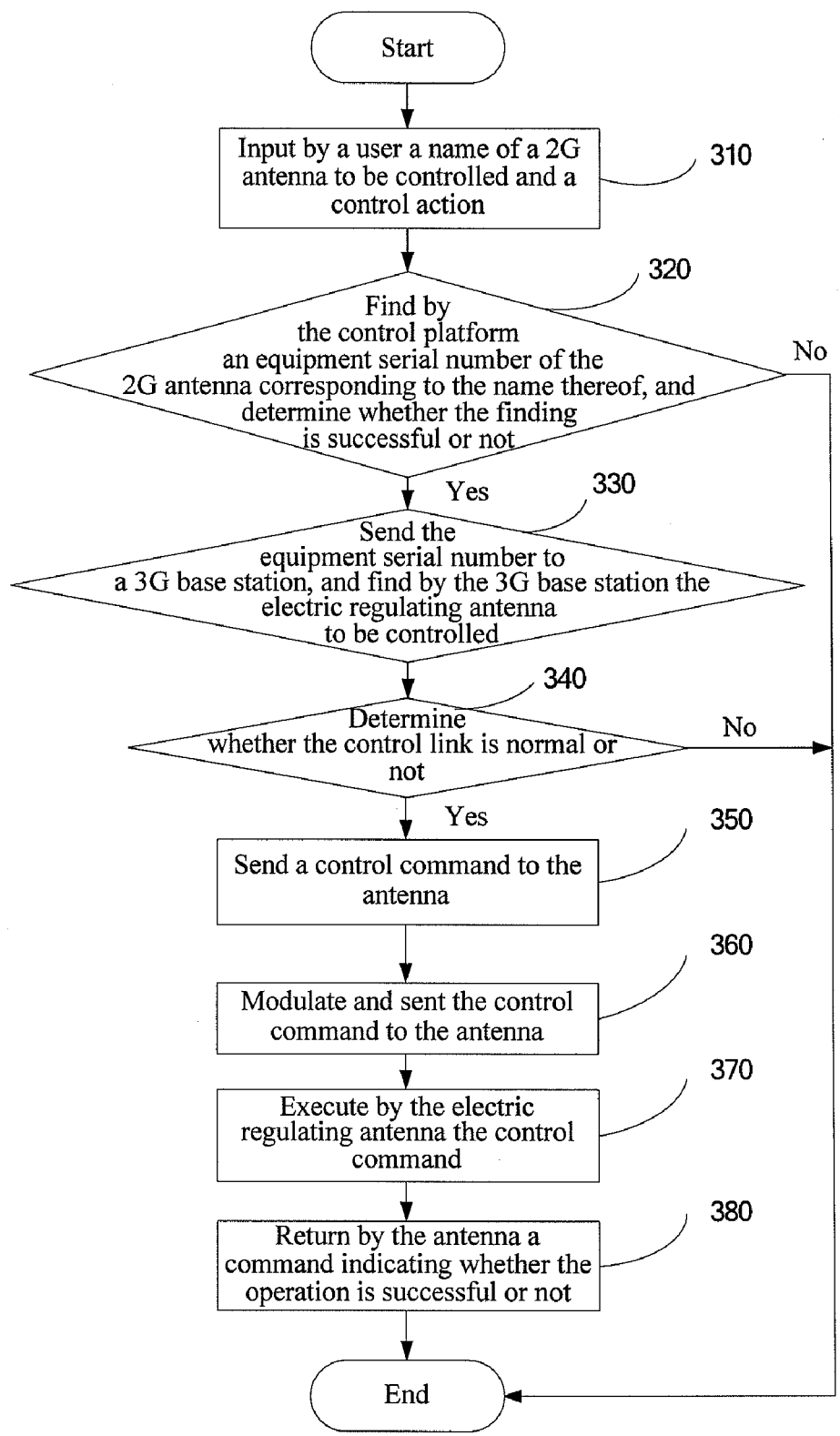
FIG. 4 is a flow chart of yet another embodiment.

Referring to FIG. 4, in a third embodiment, the control is realized by setting a name of the electric regulating antenna corresponding to a globally unique serial number of the electric regulating antenna. Differing from the second embodiment, in this embodiment, the corresponding relationship is stored in a control platform.

In Step 310, a user inputs a name of a 2G electric regulating antenna to be controlled and a control action to a control platform.

In Step 320, the control platform determines an equipment serial number of the 2G antenna. If the result is successful, Step 330 is performed; otherwise, the process ends.

In Step 330, the control platform sends the found equipment serial number of the 2G antenna to a 3G base station equipment.

In Step 340, the 3G base station equipment determines whether a control link is normal or not, and if normal, Step 350 is performed; otherwise, the process ends.

The determination of the control link is identical to the first embodiment, and the details will not be repeated herein.

In Step 350, the 3G base station equipment sends an analog signal control command to the electric regulating antenna.

In Step 360, the analog signal control command is modulated into a digital signal and then sent to the electric regulating antenna.

In Step 370, the electric regulating antenna executes the control command for down-tilt angle regulation.

In Step 380, after executing the control command, the electric regulating antenna demodulates information about whether the operation is successful or not into an analog signal, and sends the signal to the control platform through the 3G base station equipment.

The naming rule of the electric regulating antenna in this embodiment is similar to that in the second embodiment.

In this embodiment, to solve the problem that it is impossible to identify according to the station, cell, or physical location in the 3G network because the 3G network does not have relative information about the 2G network, a name of the electric regulating antenna according to the preset naming rule needs to be added in the control platform during the installation of the electric regulating antenna, the control platform determines the serial number of the electric regulating equipment according to the preset corresponding relationship and sends the serial number to the 3G base station, and the 3G base station needs to store the serial number of the 2G network electric regulating antenna to match with the antenna itself.

The modulation/demodulation process in the above three embodiments can be performed in the 3G base station equipment or the electric regulating antenna, or performed by an independent modem. Or, the modulation process is carried out in the 3G base station equipment and the demodulation process is carried out in the electric regulating antenna.

A system for implementing the central control of a 2G network electric regulating antenna is provided in the embodiments of the present disclosure, so as to achieve the central control of the 2G network electric regulating antenna that is simple in operation and easy to maintain. The RCUs of all the electric regulating antennas in the system are connected to the 3G base station by AISG control signal lines through the modem. The electric regulating antennas and modems used in the 2G and 3G networks are similar; therefore the 3G base station can be adopted to control the electric regulating antenna in the 2G network through software.

Figure 5:
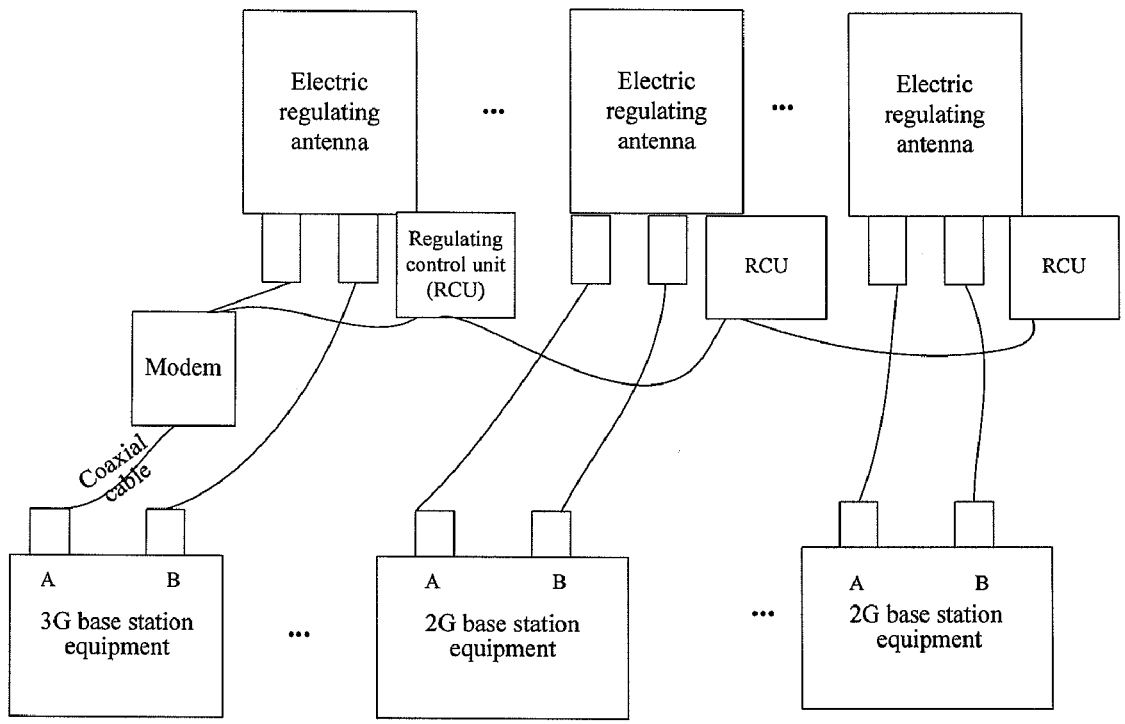
FIG. 5 is a system networking diagram of one embodiment.

Referring to FIG. 5, the system includes a control platform, a 3G base station equipment, an electric regulating antenna, and a modulation/demodulation module. In addition, the control platform, not shown in FIG. 5, functions as a man-machine interface and is a software running in a server.

When the central control of the 2G network electric regulating antenna is realized by determining the globally unique serial number of the electric regulating antenna, the control platform is mainly adapted to receive the serial number of the 2G antenna to be controlled and the control action input by the user, send the serial number of the 2G antenna to be controlled and the control action to the 3G base station, and receive an implementation result signal returned from the electric regulating antenna through the 3G base station.

The 3G base station is mainly adapted to store the serial number of the 2G electric regulating antenna, receive the serial number of the antenna and the control action from the control platform, determine the serial number of the antenna received from the control platform, determine whether a control link is normal or not, send an analog signal control command to the electric regulating antenna, and receive a control success command returned from the electric regulating antenna.

The modulation/demodulation module is mainly adapted to receive the analog signal control command from the 3G base station, modulate the signal, and send the modulated control command to the electric regulating antenna, then receive the control success signal returned from the electric regulating antenna, demodulate the signal, and send the demodulated signal to the 3G base station.

The electric regulating antenna is mainly adapted to execute the control command on receiving the command, and return the implementation result signal.

The central control of the 2G network electric regulating antenna is realized by presetting the name and the serial number of the electric regulating antenna, and the corresponding relationship between the name and the serial number of the electric regulating antenna is stored in the 3G base station.

The control platform is mainly adapted to receive the name of the 2G antenna to be controlled and the control action input by the user, send the name of the 2G antenna to be controlled and the control action to the 3G base station, and receive an implementation result signal returned from the electric regulating antenna through the 3G base station.

The 3G base station is mainly adapted to store the corresponding relationship between the name and equipment serial number of the 2G electric regulating antenna, receive the name of the antenna and the control action from the control platform, determine the serial number corresponding to the name of the antenna according to the stored corresponding relationship, then determine whether the control link is normal or not, send an analog signal control command to the electric regulating antenna, receive a control success command returned from the electric regulating antenna, and transmit the command to the control platform.

The modulation/demodulation module is mainly adapted to receive the analog signal control command from the 3G base station, modulate the signal, and send the modulated control command to the electric regulating antenna, then receive the implementation result signal returned from the electric regulating antenna, demodulate the signal, and send the demodulated signal to the 3G base station.

The electric regulating antenna is mainly adapted to execute the control command on receiving the command, and return the implementation result signal.

The corresponding relationship between the name and equipment serial number of the electric regulating antenna stored in the 3G base station is clearly described in the method of the second embodiment, and the details will not be repeated herein.

The central control of the 2G network electric regulating antenna is realized by presetting the name and the serial number of the electric regulating antenna, and the corresponding relationship between the name and the serial number of the electric regulating antenna is stored in the control platform.

The control platform is mainly adapted to store the corresponding relationship between the name and the equipment serial number of the 2G electric regulating antenna, receive the name of the 2G antenna to be controlled and the control action input by the user, determine the equipment serial number corresponding to the name of the antenna according to the stored corresponding relationship, send the serial number of the 2G antenna to be controlled to the 3G base station, and receive an implementation result signal returned from the electric regulating antenna through the 3G base station.

The 3G base station is mainly adapted to receive serial number of the antenna and the control action from the control platform, determine whether the control link is normal or not, then send an analog signal control command to the electric regulating antenna, receive an implementation result signal returned from the electric regulating antenna, and transmit the signal to the control platform.

The modulation/demodulation module is mainly adapted to receive the analog signal control command from the 3G base station, modulate the signal, and send the modulated control command to the electric regulating antenna, then receive the implementation result signal returned from the electric regulating antenna, demodulate the signal, and send the demodulated signal to the 3G base station.

The electric regulating antenna is mainly adapted to execute the control command on receiving the command, and return the implementation result signal.

The corresponding relationship between the name and equipment serial number of the 2G electric regulating antenna stored in the control platform is clearly described in the method of the second embodiment, and the details will not be repeated herein.

In the above three embodiments of the system for implementing the central control of a 2G network electric regulating antenna, the modulation/demodulation module can be disposed inside the 3G base station equipment or the electric regulating antenna, or the modulation/demodulation function is respectively implemented in the 3G base station equipment and the electric regulating antenna.

Figure 6:
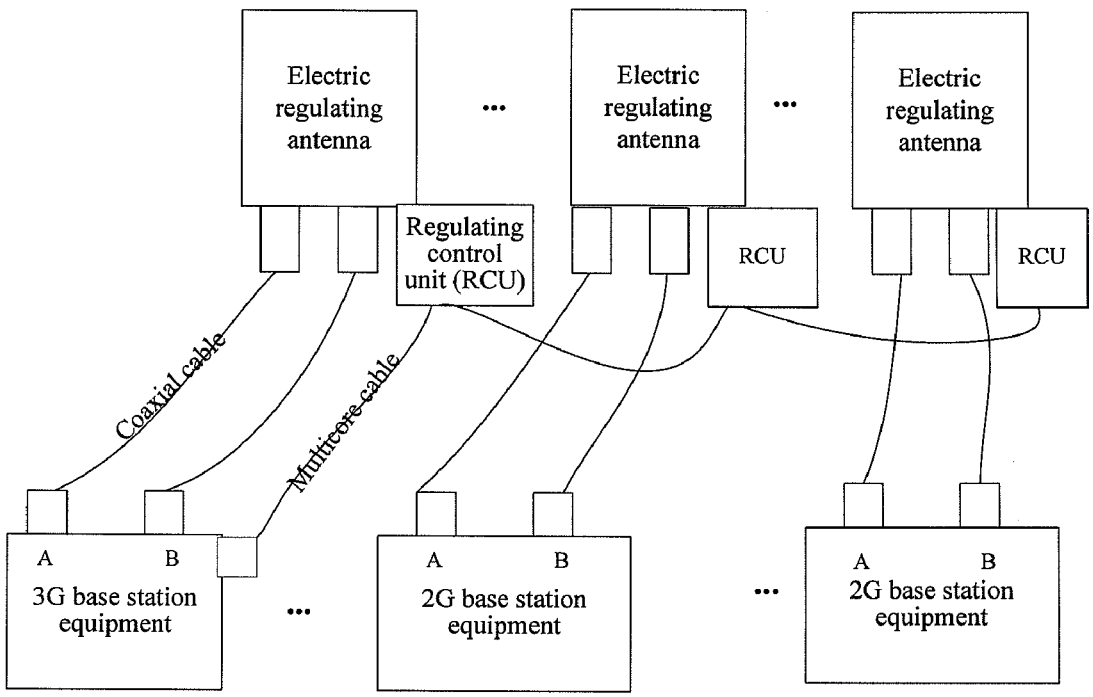
FIG. 6 is a system networking diagram of another embodiment.

Referring to FIG. 5, in the above three embodiments of the system for implementing the central control of a 2G network electric regulating antenna, all the electric regulating antennas are cascaded. However, in practice, the electric regulating antennas in each 2G network may also be connected in parallel to a modem through AISG control signal lines. The modem is connected to the 3G equipment, and the control commands are all issued by the 3G equipment. Each 2G electric regulating antenna is connected to the 2G equipment through RF signal lines, and all the RF signals are still transmitted between the 2G electric regulating antennas and the 2G equipments, as shown in FIG. 6.

In the above embodiments including the method and system embodiments, the 3G base station equipment first sends the analog signal control command to the electric regulating antenna, the control command after being modulated/demodulated reaches the 2G electric regulating antenna to be controlled, and the implementation result signal returned from the corresponding 2G electric regulating antenna is modulated/demodulated and reaches the 3G base station equipment. The above signal modulation/demodulation process may be obtained with reference to the modulation/demodulation method between various analog signals and digital signals in the prior art, and the implementation process may not limit the claims of the present specification. Meanwhile, it is to be understood that the above description is only one implementation. In other implementations the signal control command and implementation result signal may also be directly sent out in the form of digital signals, so as to skip the modulation/demodulation operation. Thereby, the modulation/demodulation module may be omitted from the corresponding system.

FIG. 5 shows an embodiment, and thus a system for implementing the central control of a 2G network electric regulating antenna may only include a control platform and a 3G base station equipment.

It should be noted that, those of ordinary skill in the art may understand that all or a part of the steps in the method of the above embodiment can be fulfilled by relative hardware through a program. The program may be stored in a computer readable storage medium, and the execution of the program includes the steps of the method. Further, the storage medium includes ROM/RAM, magnetic disk, and optical disk.

The method and system for implementing the central control of a 2G network electric regulating antenna are illustrated in detail in the embodiments of the present disclosure. The above examples and embodiments are only provided to help understanding the claims and are not intended to limit the scope of the claims. It is understood that those of ordinary skill in the art may make modifications and variations to the various embodiments described above without departing from the spirit and scope of the claims.

What is claimed is:

1. A method for implementing a central control of a 2G network electric regulating antenna, comprising:
   receiving, by 3G base station equipment, an ID associated with a 2G network electric regulating antenna to be controlled and a control command;
   determining, by the 3G base station equipment, the 2G network electric regulating antenna that based on the received ID; and
   sending, by the 3G base station equipment, the control command to the 2G network electric regulating antenna so as to control the 2G network electric regulating antenna.

2. The method according to claim 1, wherein:
   the 3G base station equipment receives the ID associated with the 2G network electric regulating antenna to be controlled and the control command through a control platform;
   the ID comprises an equipment serial number of the 2G network electric regulating antenna; and
   the determining the 2G network electric regulating antenna based on the ID comprises:
   determining, by the 3G base station equipment, the 2G network electric regulating antenna to be controlled through the equipment serial number.

3. The method according to claim 1, wherein:
   the 3G base station equipment receives the ID associated with the 2G network electric regulating antenna to be controlled and the control command through a control platform;
   the ID comprises a name of the 2G network electric regulating antenna based on a naming rule; and
   the determining the 2G network electric regulating antenna based on the ID comprises:
   determining an equipment serial number corresponding to the name based on the naming rule, and
   determining the electric regulating antenna to be controlled based on the equipment serial number.

4. The method according to claim 2, wherein:
   the equipment serial number of the 2G network electric regulating antenna is sent by the control platform and is obtained through: receiving, by the control platform, a name of the 2G network electric regulating antenna to be controlled and the control command, determining, by the control platform, the equipment serial number corresponding to the name via the naming rule, and sending, by the control platform, the equipment serial number to the 3G base station equipment.

5. The method according to claim 1, further comprising:
   determining, by the 3G base station equipment, before the 3G base station equipment sends the control command to the 2G network electric regulating antenna, whether a control link with the 2G network electric regulating antenna to be controlled is normal or not, and if normal, sending the control command to the 2G network electric regulating antenna.

6. The method according to claim 1, wherein:
   the control command sent by the 3G base station equipment to the 2G network electric regulating antenna is modulated before reaching the 2G network electric regulating antenna; and
   wherein after the sending, by the 3G base station equipment, the control command to the 2G network electric regulating antenna, the method further comprises:
   receiving, by the 3G base station equipment, an implementation result returned from the 2G network electric regulating antenna and transmitting, by the 3G base station equipment, the implementation result to a control platform; where the implementation result includes at least one of: success or failure information.

7. A system for implementing a central control of a 2G network electric regulating antenna, the system comprising:
   a control platform configured to receive and send an ID associated with the 2G network electric regulating antenna to be controlled and a control command to 3G base station equipment; and
   the 3G base station equipment configured to receive the ID of the 2G network electric regulating antenna and the control command from the control platform, determine the 2G network electric regulating antenna based on the ID, and send the control command to the 2G network electric regulating antenna, so as to control the 2G network electric regulating antenna.

8. The system according to claim 7, wherein:
   the ID of the electric regulating antenna received and sent by the control platform is an equipment serial number of the 2G electric regulating antenna; and
   the 3G base station equipment is configured to determine the 2G network electric regulating antenna to be controlled via the equipment serial number.

9. The system according to claim 7, wherein:
   the ID of the electric regulating antenna received and sent by the control platform is a name of the 2G network electric regulating antenna; and
   the 3G base station equipment is further configured to store information that defines a relationship between the name of the 2G network electric regulating antenna and an equipment serial number, determine the equipment serial number corresponding to the received name via the stored information, and determine the 2G network electric regulating antenna to be controlled via the equipment serial number.

10. The system according to claim 7, wherein:

the ID of the electric regulating antenna received and sent by the control platform corresponds to a name associated with the 2G network electric regulating antenna; and the control platform is further configured to store information that defines a relationship between the name associated with the 2G network electric regulating antenna and an equipment serial number, determine the equipment serial number corresponding to the received name of the 2G network electric regulating antenna via the stored information, and send the equipment serial number of the 2G network antenna to be controlled and the control command to the 3G base station equipment.

11. The system according to claim 7, wherein:

the 3G base station equipment is further configured to send the control command to the 2G network electric regulating antenna after ensuring that a control link associated with the 2G network electric regulating antenna to be controlled is normal.

12. The system according to claim 7, wherein the 2G network electric regulating antenna is further configured to return an implementation result signal to the 3G base station equipment; and the 3G base station equipment is further configured to receive and return the implementation result signal to the control platform.

13. The system according to claim 7, further comprising:

a modem, configured to modulate the control command after the 3G base station equipment sends the control command, send the modulated control command to the 2G network electric regulating antenna, receive an implementation result signal returned by the 2G network electric regulating antenna, demodulate the implementation result signal, and send the demodulated implementation result signal to the 3G base station equipment.

14. The system according to claim 13, wherein the 2G network electric regulating antenna is one of a plurality of electric regulating antennas, wherein a first electric regulating antenna is connected to the modem and other electric regulating antennas are cascaded to the first electric regulating antenna.

15. The system according to claim 13, wherein the 2G network electric regulating antenna is one of a plurality of electric regulating antennas, wherein each electric regulating antenna is connected to the modem.

16. A 3G base station, comprising:

a receiver of the 3G base station, configured to receive an ID associated with a 2G network electric regulating antenna to be controlled and a control command; and a control unit of the 3G base station, configured to determine the 2G network electric regulating antenna based on the ID, and send the control command to the 2G network electric regulating antenna associated with the ID, so as to control the 2G network electric regulating antenna.

17. The 3G base station according to claim 16, wherein the ID comprises an equipment serial number of the 2G network electric regulating antenna.

18. The 3G base station according to claim 16, wherein the ID comprises a name of the 2G network electric regulating antenna based on a naming rule; and the 3G base station further comprising a memory unit, configured to store information that defines a relationship between the name of the 2G network electric regulating antenna and an equipment serial number;

the control unit is further configured to determine the equipment serial number corresponding to the received name according to the stored information and send the control command to the 2G network electric regulating antenna associated with the equipment serial number.

19. The 3G base station according to claim 16, wherein the 3G base station is further configured to send the control command to the 2G network electric regulating antenna after ensuring that a control link associated with the 2G network electric regulating antenna to be controlled is normal.

20. The 3G base station according to claim 16, wherein the 3G base station is further configured to receive an implementation result signal from the 2G network electric regulating antenna and return the implementation result signal to a control platform.

* * * * *